United States Patent [19]
Eves, II

[11] 3,743,864

[45] July 3, 1973

[54] CIRCUIT FOR DETECTING COINCIDENCE BETWEEN LOW ENERGY SHORT RISE SIGNALS

[75] Inventor: Ellis E. Eves, II, Nabnasset, Mass.

[73] Assignee: Sperry Rand Corporation, New York, N.Y.

[22] Filed: Sept. 9, 1971

[21] Appl. No.: 178,993

[52] U.S. Cl. .................. 307/302, 307/218, 307/232, 307/283

[51] Int. Cl. .......................... H03k 3/26, H03k 19/24

[58] Field of Search .................... 307/283, 302, 218, 307/232

[56] References Cited

UNITED STATES PATENTS 3,308,308 3/1967 Bray .............................. 307/283 X

OTHER PUBLICATIONS

"Avalanche Transistor Circuits" in Electronic World by Silver, Sept. 1967, pages 30–32

*Primary Examiner*—Stanley D. Miller, Jr.
*Attorney*—S. C. Yeaton

[57] ABSTRACT

A circuit for detecting coincidence between a short pulse signal and a gating signal comprises an avalanche transistor with a fast switching diode connected in series with the base emitter diode thereof. The short pulse signal and the gating signal are applied to the base emitter diode of the avalanche transistor and to the fast switching diode respectively.

5 Claims, 4 Drawing Figures

INVENTOR
ELLIS E. EVES II
BY
HP Terry
ATTORNEY

Patented July 3, 1973 3,743,864

2 Sheets-Sheet 2

INVENTOR
ELLIS E. EVES II
BY
ATTORNEY

CIRCUIT FOR DETECTING COINCIDENCE BETWEEN LOW ENERGY SHORT RISE SIGNALS

BACKGROUND OF THE INVENTION

1. Field of the Invention

The invention relates to pulse coincidence detectors particularly of the type applicable to short baseband pulses.

2. Description of the Prior Art

Systems are currently being developed that utilize short baseband pulses which may, for example, have durations of less than 1 nanosecond. Such a system is disclosed in applicant's assignee's U.S. patent application Ser. No. 123,533 filed Mar. 12, 1971, "Short Base-Band Pulse Communication System" in the name of G. F. Ross. Another such system is disclosed in applicant's assignee's U.S. patent application Ser. No. 137,355 filed Apr. 26, 1971, "Energy Amplifying Selector Gate For Base-Band Signals" by G. F. Ross. In these and other systems, such as radar target detection systems, digital computer systems, and multiplexing systems, an avalanche transistor circuit for detecting low energy sub-nanosecond pulses and providing high energy relatively long duration pulses compatible with conventional circuitry is included. Such circuits are of relatively simple design and comprise a single avalanche transistor. These circuits may be of the type disclosed in U.S. Pat. No. 3,421,025, "High-Speed Avalanche Switching Circuit", by W. B. Mitchell et al, issued Jan. 7, 1969.

Although such single transistor circuits detect low energy, short baseband pulses and provide high energy, relatively long duration pulses compatible with conventional circuitry, it would be desirable if these circuits could be operated in a gated mode in response to sub-nanosecond gating pulses, hence providing the capability of operating at gigahertz rates. Such fast circuits may, for example, find utility in digital computer systems for performing the pulse coincidence or AND logic function at a heretofore unachievably high rate. It is believed, however, that the normally high capacitance associated with the base emitter diode of available avalanche transistors precludes gigahertz operation because of the required charging and discharging of this capacitance when turning the transistor on and off.

SUMMARY OF THE INVENTION

The objective of the invention is achieved by a circuit for detecting coincidence between a short pulse signal and a gating signal comprising an avalanche transistor with a fast switching diode connected in series with the base emitter diode thereof. The base emitter diode of the transistor and the fast switching diode are adapted to receive the signals, respectively, between which coincidence is detected. The fast switching diode, which normally has a low reverse capacitance, controls the switching of the avalanche transistor thus providing the desired gigahertz operation.

DESCRIPTION OF THE PREFERRED EMBODIMENT

Figure 1:
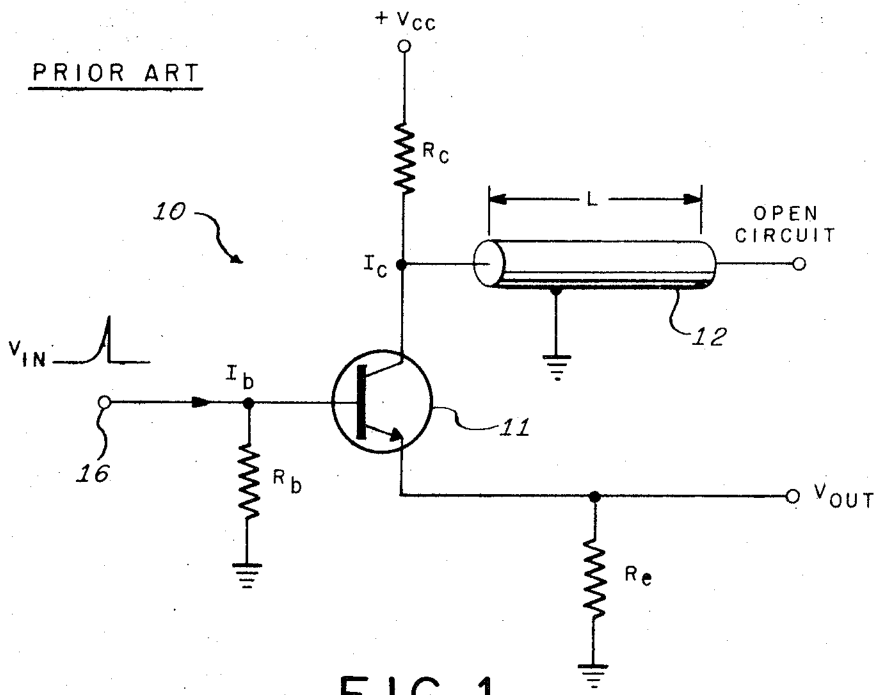
FIG. 1 is a schematic circuit diagram of a prior art avalanche transistor short pulse detecting circuit.

Referring to FIG. 1, a high speed detector 10 of low energy, short baseband pulses is illustrated. The detector 10 is of the type shown and described in said U.S. Pat. No. 3,421,025 and will therefore be only briefly explained here. The detector 10 comprises a transistor 11 that receives its collector bias potential $+V_{cc}$ through a collector resistor $R_c$. The short pulses to be detected are applied to the base lead of the transistor 11 across a base resistor $R_b$. The pulse output of the device may be taken across an emitter resistor $R_e$ where the duration of the output pulse is controlled, in a manner to be described, by a charge on transmission line 12 connected to the collector of the transistor 11. In order for the pulse detector 10 to operate effectively, the transistor 11 should be selected to exhibit $V_{ce}$-$I_c$ characteristics of the type illustrated in FIG. 2. Such transistors are referred to and defined herein as "avalanche" transistors for convenience.

Figure 2:
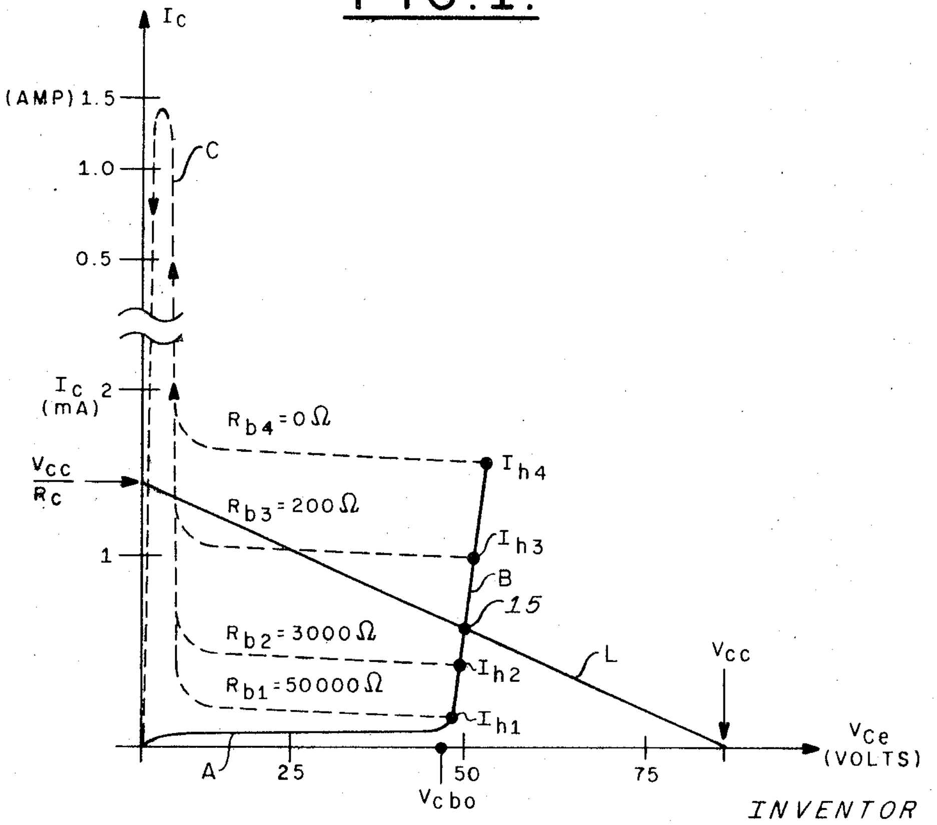
FIG. 2 is a graph illustrating typical operational characteristics of the circuit shown in FIG. 1.

Referring now to FIG. 2, as the voltage between the collector and emitter of transistor 11, $V_{ce}$, increases from zero, the collector current $I_c$ through the transistor has a very low value indicated by the portion A of the graph. The portion A represents the high impedance state of the transistor 11. When the voltage $V_{ce}$ across the transistor 11 attains the collector base breakdown voltage $V_{cbo}$, as indicated by the legend, the current $I_c$ rises abruptly while the voltage $V_{ce}$ remains substantially constant. It is believed that this constant voltage portion of the graph, designated as B, is representative of the Zener breakdown region of the transistor 11. When the current $I_c$ attains a value $I_h$ known as the holding current, the transistor 11 breaks down with the voltage $V_{ce}$ collapsing to a few volts in fractions of a nanosecond. The holding current $I_h$, at which this breakdown occurs, is dependent upon the value of the base resistor $R_b$ in a manner to be explained. It is believed that this collapse of the $V_{ce}$ voltage in fractions of a nanosecond is caused by the secondary breakdown phenomenon described in the August, 1967 Proceedings of the IEEE, Volume 55, No. 8, on page 1272 in the H. A. Schafft paper, "Second Breakdown--A Comprehensive Review". In the secondary breakdown region of operation, indicated by the dashed portions of the graph of FIG. 2, the voltage $V_{ce}$ collapses to a small value and the current $I_c$ through the transistor increases to a relatively high value on the order of several amperes. The transistor 11 remains in this breakdown condition until the source of collector current has become discharged, when its operating point drops to a position near the origin after which the process described above is repeated.

Referring still to FIGS. 1 and 2, it is believed that the criterion for entering the secondary breakdown region is that the voltage drop across $R_b$ caused by the collector-base reverse leakage current must equal or exceed the forward voltage drop $(V_{be})_c$ of the transistor 11 when it is conducting. Thus it will be appreciated that the point $I_h$, at which secondary breakdown occurs, may be varied by adjustments of the value of the base resistor $R_b$. Typically $(V_{be})_c$ may be approximately 0.6 V for silicon transistors and the value of $R_b$, determinant of the point $I_h$, must include any internal base resistance $r_b$ of the transistor. Typically $r_b$ is in the range of from 5 to 500 Ohms.

In the operation of the device of FIG. 1 in accordance of the characteristic curves of FIG. 2, a value for the collector bias voltage $V_{cc}$ and a value for the collector resistor $R_c$ are selected thus establishing a load line L as indicated in FIG. 2. For base resistors $R_{b1}$ and $R_{b2}$, as indicated in FIG. 2, the corresponding holding currents $I_{h1}$ and $I_{h2}$ are less than the intersection point 15 where the load line L intersects the section B of the characteristic curve. Thus for these values of base resistance $R_b$, the circuit 10 is unstable and oscillates traversing the portions of the characteristic curve associated therewith. For values of the base resistor $R_{b3}$ and $R_{b4}$, the corresponding holding currents $I_{h3}$ and $I_{h4}$ are above the intersection point 15. Thus, for these values of base resistance, the circuit 10 is stable and operates quiescently at the point 15. It will thus be appreciated that for a given load line L, $R_b$ may be adjusted such that the corresponding holding current $I_h$ is a small increment above the load line L. Under this condition, a small increment of current equal to the difference between the holding current $I_h$ associated with the selected value of $R_b$ and the operating current $I_c$ at the intersection point 15 will trigger the circuit 10 into the secondary breakdown region. This additional current is provided by a low-level trigger pulse $V_{in}$ at a base input terminal 16 resulting a current flow of $I_b$ through the base resistor $R_b$. Hence the transistor 11 will break down when $(I_c + I_b)(R_b + r_b) \geq (V_{be})_c$.

With the base resistor $R_b$ chosen in this manner, the circuit 10 quiescently operates at the point 15 of FIG. 2. At quiescence, the transistor 11 is in its high impedance state, and thus the transmission line 12 is charged to the collector base Zener breakdown voltage $V_{cbo}$. Upon application of the sub-nanosecond trigger pulse $V_{in}$ at the base terminal 16, the resultant current $I_b$ combines with the quiescent collector-base reverse leakage current $I_c$ through the resistor $R_b$ causing the holding current $I_h$ to be exceeded, thus triggering the transistor 11 into secondary breakdown. When this occurs, the transistor 11 assumes a low impedance state discharging the transmission line 12 through the emitter resistor $R_e$ thus generating an output pulse $V_{out}$. In traversing the characteristic curve of FIG. 2 in response to the trigger pulse $V_{in}$, a relatively large current on the order of amperes, as indicated by the portion C of the characteristic curve, passes through the emitter resistor $R_e$. Thus the output pulse $V_{out}$ is provided at a voltage level compatible with conventional circuitry. The collapsing of the collector current $I_c$, as indicated by the characteristic curve of FIG. 2, results in the termination of the transistor breakdown process and the characteristic curve returns to a point near the origin. With the transistor 11 now in its high impedance state, the transmission line 12 recharges through the collector-resistor $R_c$ in accordance with the portion A of the characteristic curve once again returning to the quiescence point 15.

The length of the transmission line 12 determines the duration of the output pulse $V_{out}$ as follows. When secondary breakdown is initiated and the collector end of the transmission line 12 essentially drops from $V_{cc}$ to near ground potential, a pulse travels down the length of the line 12, is reflected at the opencircuit end thereof and returns to the collector end of the line. When this pulse is traveling along the line 12, a substantially constant current is provided by the line 12 through the transistor 11 to the emitter resistor $R_e$, which current generates the output pulse $V_{out}$. Thus it is appreciated that the duration of the output pulse is directly proportional to the length of the line 12.

Figure 3:
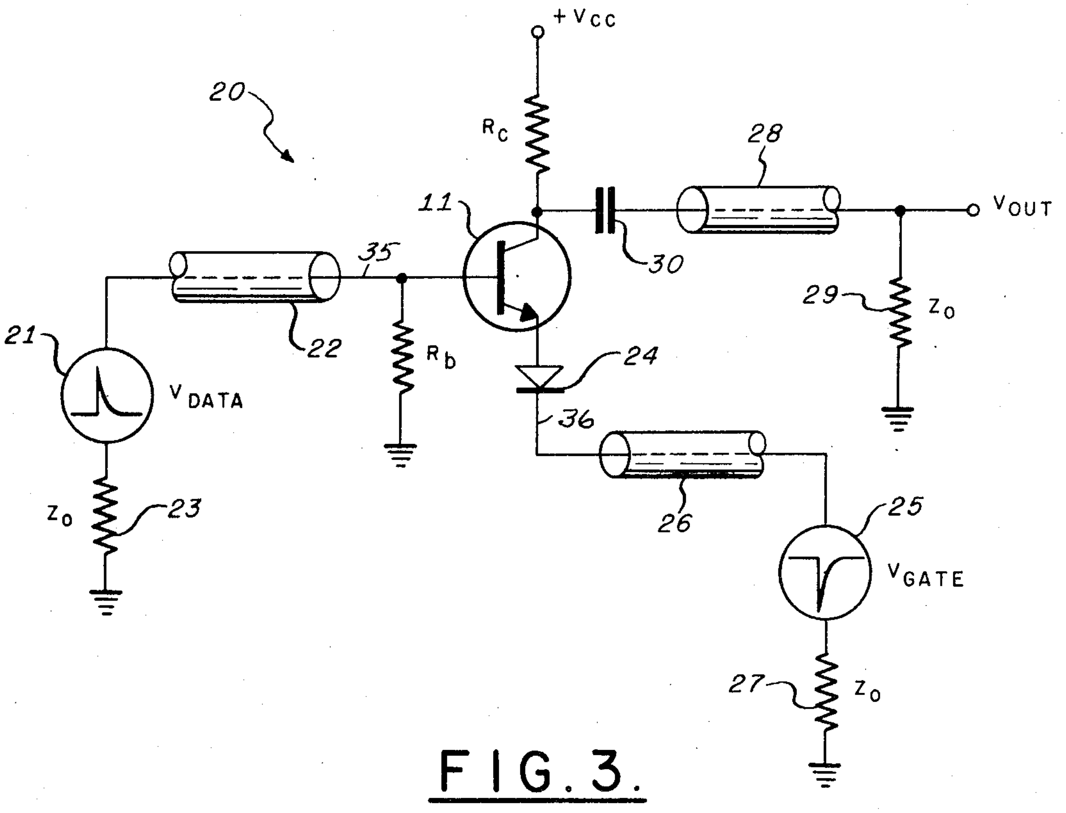
FIG. 3 is a schematic circuit diagram of an avalanche transistor short pulse coincidence detector configured in accordance with the present invention.

It would be desirable for the reasons discussed above to utilize the prior art short-pulse detector 10 as a short pulse, high speed coincidence circuit. The high capacitance, however, of the base emitter diode of the transistor 11 prevents high speed switching of the device when it is utilized in a gated mode. It is believed that almost all currently available transistors exhibit this high capacitance condition. FIG. 3 illustrates a short pulse coincidence gate capable of high speed operation in accordance with the present invention.

Referring now to FIG. 3 in which like reference numerals indicate like components with respect to FIG. 1, a coincidence circuit 20 is depicted. In a manner similar to that described above, the coincidence circuit 20 includes the avalanche transistor 11 with its collector biased by the $V_{cc}$ power supplyth through the collector resistor $R_c$. The short pulse input to the base of the transistor 11 is provided across the base resistor $R_b$ via an input lead 35 by a $V_{data}$ source schematically indicated at 21. The $V_{data}$ pulse source may typically comprise a transmission line 22 along which the data pulses are traveling. The characteristic impedance $Z_0$ of the line 22 is schematically indicated at 23. The impedance $Z_0$ is typically approximately 50 Ohms.

Figure 4:
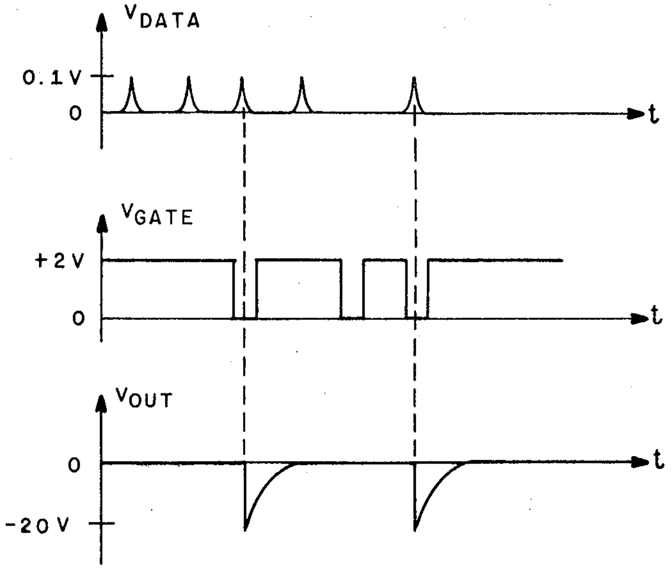
FIG. 4 is a waveform timing diagram illustrating signals appearing at various points of FIG. 3.

The emitter of the transistor 11 is connected through a fast switching diode 24 via an input lead 36 to a second source of pulses designated as $V_{gate}$ and schematically indicated at 25. It is appreciated that the $V_{gate}$ pulses may comprise short sub-nanosecond pulses. In a typical embodiment, the source of $V_{gate}$ pulses 25 may comprise a transmission line 26 having a characteristic impedance $Z_0$ schematically indicated at 27. In a manner similar to the transmission line 22, the characteristic impedance $Z_0$ of the transmission line 26 is normally approximately 50 Ohms. For the NPN transistor 11 illustrated, the source 21 provides positive-going pulses and the source 25 provides negative-going pulses as illustrated in FIG. 4. The fast switching diode 24 is a low charge storage diode which may be instrumented, for example, by a commercially procurable hot carrier diode.

The collector of the transistor 11 provides the output pulses $V_{out}$ to a utilization device which may, for example, comprise a transmission line 28. The transmission line 28 has a characteristic impedance $Z_0$ indicated schematically at 29 which may typically be approximately 50 Ohms. The output pulse is provided to the transmission line 28 by means of a capacitor 30 having a capacitance, normally a few picofarads, selected in accordance with the desired speed of the circuit.

With the emitter input $V_{gate}$ at ground potential, the triggering condition for the circuit 20 is modified slightly with respect to the circuit 10 since breakdown now occurs for a voltage across $R_b$ approximately equal to the sum of the forward voltage drop $(V_{be})_c$ for the transistor 11 and for the hot carrier diode 24. The quiescent operating point 15 (FIG. 2) for the transistor 11 may be selected sufficiently close to the breakdown holding current $I_h$ by an adjustment in the value of $R_b$, $R_c$ or $V_{cc}$. Typically, the circuit 20 may be configured to trigger on a $V_{data}$ pulse in the range from 0.1 to 1 volt in amplitude for a base resistance $R_b$ of 50 Ohms with ground potential being provided by the gating source 25. In a typical application, the source 25 quiescently provides approximately 2 volts preventing triggering of the device by base pulses of less than 2 volts in amplitude.

In operation, in a typical embodiment of the coincident circuit 20, the base and emitter inputs of the transistor 11 are connected to the transmission lines 22 and 26 providing nominal d.c. voltages of 0v and +2v respectively. A negative pulse from the source 25 which reduces the emitter potential to 0 volts, when coincident with an input base pulse of 0.1 to 1 volt, causes a pulse to be generated at the collector in the manner previously described with respect to FIG. 1 signifying the coincidence. In the coincidence gate 20, however, the pulse current is provided by the discharge of the capacitor 30 rather than the transmission line 12 of FIG. 1. Since the absence of either of the two input pulses from the sources 21 and 25 prevents breakdown of the transistor 11, the circuit 20 functions as an AND gate with extremely fast operation using nanosecond or subnanosecond pulses and generating typically several tens of volts at the collector. When the $V_{data}$ and the $V_{gate}$ pulses are coincident, a negative pulse $V_{out}$ is provided as illustrated in FIG. 4, which pulse is compatible with conventional circuitry as previously described.

It will be appreciated that since the hot carrier diode 24 is in series with the base emitter diode of the transistor 11, the switching of the transistor 11 may be effected by switching either of these diodes. Since the hot carrier diode 24 is a fast switching device because of its small charge storage capacity, the circuit 20 may be operated at gigahertz gating rates which would not be possible in the absence of the fast switching diode 24 for the reasons previously discussed.

Although the invention was illustrated in terms of the NPN transistor 11, it will be appreciated that a PNP transistor may be utilized to the same effect. In this instance, all of the potentials illustrated and described would be reversed. The present invention was described in terms of applying the $V_{data}$ pulses and $V_{gate}$ pulses to the base and emitter of the transistor 11, respectively, and placing the diode 24 in the emitter leg thereof. It is believed that limited operation may be achieved by reversing the data sources 21 and 25 with respect to the base and emitter of the transistor 11, respectively, and placing the diode 24 in the base lead thereof.

It will be appreciated that any transistor having the properties illustrated in FIG. 2 may be utilized in practicing the invention such transistors being denoted and defined herein as avalanche transistors for convenience. An embodiment of the invention was successfully constructed utilizing a 2N5130 transistor.

Although the above-described embodiment of the invention was explained in terms of short baseband input signals, it will be appreciated that bursts of carrier signal such as pulsed r.f. may also be utilized at the input to the device.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A coincidence detector circuit for detecting coincidence between a pulse signal and a gating signal comprising avalanche transistor means having a base-emitter diode and a collector, fast switching diode means having two terminals, one of said terminals being coupled to said base-emitter diode, means for coupling said signals to said base-emitter diode and the other of said terminals of said fast switching diode means respectively, and means coupled to said collector for providing an output signifying said coincidence.

2. A coincidence detector circuit for detecting coincidence between a short pulse signal and a gating signal comprising avalanche transistor means having a base, a collector and an emitter, fast switching diode means having two terminals, one of said terminals being coupled to said emitter, means for coupling said short pulse and gating signals to said base and the other of said terminals of said fast switching diode means respectively, and means coupled to said collector for providing an output signifying said coincidence.

3. The circuit of claim 2 in which said fast switching diode means comprises a hot carrier diode.

4. A coincidence detector circuit for detecting coincidence between short pulse signals comprising avalanche transistor means having a base, a collector and an emitter, fast switching diode means having two terminals, one of said terminals being coupled to said emitter, means for coupling said short pulse signals to said base and the other of said terminals of said fast switching diode means respectively, and means coupled to said collector for providing an output signifying said coincidence.

5. A coincidence detector circuit for detecting coincidence between a subnanosecond duration pulse signal and a gating signal comprising avalanche transistor means having a base-emitter diode and a collector, fast switching diode means having two terminals, one of said terminals being coupled to said base-emitter diode, means for coupling said signals to said base-emitter diode and the other of said terminals of said fast switching diode means respectively, and means coupled to said collector for providing an output signifying said coincidence.

* * * * *